Feb. 24, 1959 A. E. NASHMAN ET AL 2,875,334
SWEEP VOLTAGE GENERATOR
Filed May 13, 1955
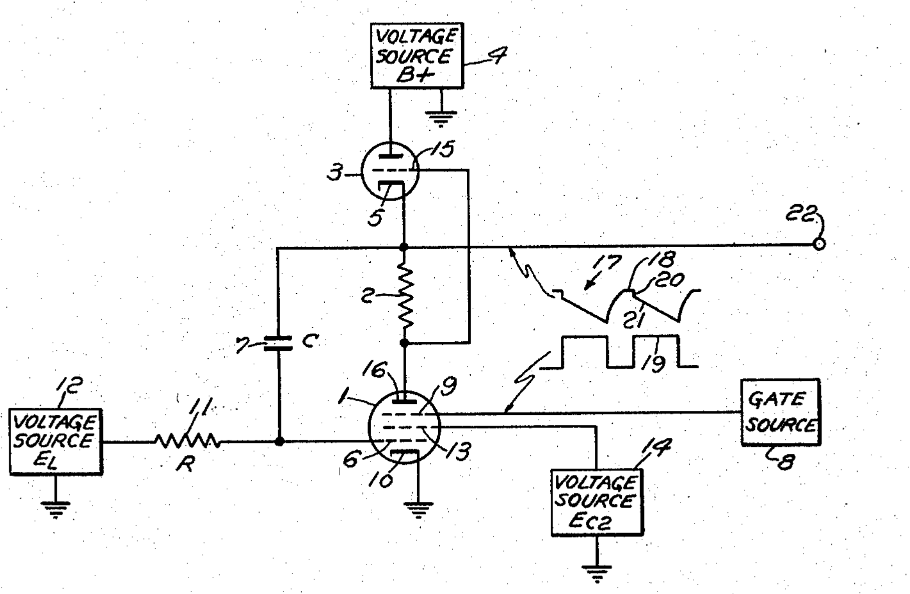
INVENTORS
ALVIN E. NASHMAN
GERALD RABOW
BY Alfred C. Hill
AGENT United States Patent Office 2,875,334

Patented Feb. 24, 1959

2,875,334

SWEEP VOLTAGE GENERATOR

Alvin E. Nashman, New York, and Gerald Rabow, Brooklyn, N. Y., assignors to International Telephone and Telegraph Corporation, Nutley, N. J., a corporation of Maryland Application May 13, 1955, Serial No. 508,116

7 Claims. (Cl. 250—27)

This invention relates to sweep voltage generators and more particularly to a sweep voltage generator of the sawtooth type having an improved linearity.

Early sweep voltage generators of the sawtooth type suitable for utilization with an oscilloscope employed a constant current device, such as a pentode type electron discharge device, to charge a condenser in series relation with the anode of the pentode and the anode supply voltage thereof. A gaseous discharge device was included therein in a switching relation with the charging condenser to discharge the condenser at a given time to achieve a substantially instantaneous return to a stable condition to achieve a rapid flyback of the electron beam on the screen of the oscilloscope. The operation of these types of sawtooth generators depends for its operation on the fact that the pentode has a high incremental anode resistance and, therefore, the current is reasonably constant even for large anode voltage variations. The sweep portion of the sawtooth wave is exponential in form and has a relatively poor linearity of sweep voltage as a consequence.

With the ever increasing demands on the electronic art to achieve more accurate indications of electrical quantities or other phenomenon on the screen of an oscilloscope, various sweep voltage generators have been devised to provide a more linear sweep portion of a sawtooth waveform than was capable with the above type of generators. Through the years sawtooth generators have constantly been improved to provide better linearity. The prior art generator producing the most linear sawtooth waveform is represented by a circuit employing negative feedback path including an integrator circuit which has become commonly known in the art as the Miller integrator circuit. Negative feedback sawtooth generators of the prior art include single stage amplifiers having a pentode with a load impedance of either a resistor or a resistance and an inductance in series and multistage amplifiers of this type where very high gain is desired. The multistage amplifier is usually gated by applying a pulse to the grid of the first stage. The single stage amplifier employing a pentode is gated on the suppressor grid.

The linear operation of a single stage negative feedback linear sawtooth generator having a resistive anode load depends upon keeping the voltage at the control grid of a pentode type electron discharge device constant. If this voltage is kept constant, then the current through the R-C time constant is kept constant and the voltage at the anode of the pentode device will decrease linearly. However, in the prior art arrangements the variation of the voltage at the control grid could not be kept at zero because the control grid voltage must increase with time to allow the pentode device to draw an increasing current. The pentode current increases due to the fact that as the voltage at the anode decreases, the current through the load resistance must increase. Conventional one stage sawtooth generators of this type are capable of linearities, that is, variations in the slope of the sweep portion of the sawtooth waveform, only in the order of one percent.

With the present state of the art, linearity of better than 0.06 percent can be achieved by using two additional amplifier stages. However, the solution of achieving such linearities of sweep voltage carries with it the difficulty of stabilizing a wide bandwidth feedback amplifier with a gain in the order of 1,500 operated at rapid repetition rates.

Therefore, it is an object of this invention to provide an improved single stage sawtooth waveform generator of the negative feedback type.

Another object of this invention is to provide a single stage, resistive load, negative feedback type of sawtooth waveform generator capable of producing sweep voltages having a linearity comparable with the linearity of sweep voltages produced by a multistage negative feedback type of sawtooth waveform generator.

A feature of this invention is the provision of a pentode type electron discharge device and an R-C time constant network, a component of which is coupled in a feedback manner between the anode circuit and the control grid of the pentode device such that the current conducted through the pentode device is the same constant current which flows through the time constant network to substantially eliminate an increase in tube current when the sweep voltage is produced in the anode circuit of the pentode device.

Another feature of this invention is the provision of a means in the anode circuit of the pentode device of the above arrangement to recharge the condenser of the time constant network and cooperate in limiting the current flow through the pentode device upon discharge of the condenser.

The above mentioned and other features and objects of this invention will become more apparent by reference to the following description taken in conjunction with the accompanying drawing, the single figure of which illustrates schematically an embodiment of this invention.

The linear sawtooth generator of this invention comprises a single negative feedback amplifier stage including a constant current electron discharge device, illustrated as pentode 1, an anode current limiting resistance 2 and a triode type electron discharge device 3 connected in series between an anode voltage source 4 and a reference potential, illustrated herein to be ground. A feedback path is provided from the junction of resistance 2 and cathode 5 of device 3 to the control grid 6 of pentode 1 including condenser 7.

Pentode 1 is biased to be normally in a condition of non-conduction by a potential supplied from gate source or switch device 8 to the suppressor grid electrode 9 when the gate pulse is absent. The potential from source 8 renders grid 9 move negative than cathode 10 which is coupled directly to the reference potential, ground. The difference of potential may be in the order of 100 volts. Control grid 6 is connected by means of resistor 11 to voltage source 12. A predetermined value of the voltage of source 12 and a given value of resistor 11 establishes the quantity of discharge current, the current flowing through the pentode 1 when condenser 7 is being discharged. This places control grid 6 at a potential positive with respect to cathode 10 thereby causing cathode current to flow. The cathode current flows to screen grid 13 since the negative suppressor grid 9 cuts off substantially all anode current. The space current in device 1 is controlled by the voltage supplied by source 14 to a value such that the screen grid wattage is not excessive.

It is the usual practice in sawtooth generators to charge a condenser in the circuit at a given rate and then discharge this condenser at a given rate to provide the sweep voltage. The condenser 7 in the feedback path of this circuit of this invention provides this function. With pentode 1 cut-off in the absence of the gating pulse, there is no charging path through the pentode 1. However, device 3 which is normally in conductive condition in the absence of the gating pulse provides a charging path including source 12, resistance 11, condenser 7, device 3, and source 4. Device 3 is rendered conductive by connecting grid 15 to anode 16 of pentode 1. Anode 16 is at a potential less than the anode voltage by the small voltage drop across the conductive device 3 and equal to the cathode potential of cathode 5.

Condenser 7 is charged to a voltage substantially equal to the voltage of source 4. At the end of the charging period, as indicated in curve 17 by portion 18 thereof, the positive gating pulse 19 of source 8 is applied to suppressor grid 9. The pulse 19 drives pentode 1 into conduction resulting in a flow of anode current. When conduction is present in pentode 1, the potential at anode 16 starts to drop rather abruptly as indicated at 20 in curve 17. This initial voltage drop at anode 16 is sufficient to bias device 3 into non-conduction. Since condenser 7 cannot drop instantaneously, the initial voltage drop will change to a linear negative going sweep voltage as depicted at 21 in curve 17.

A linear sweep voltage is provided at terminal 22 by maintaining the voltage at the control grid 6 substantially constant. This is accomplished herein by limiting the current conducted through pentode 1 to the constant current which flows through the time constant network including resistor 11 and condenser 7, the current path to source 4 being blocked by the non-conductive device 3. Thus, with this arrangement the tendency for the grid voltage to increase with time to allow the tube to draw an increasing current to supply the necessary current to the prior art load resistance as the anode voltage decrease is substantially eliminated.

The above cyclic operation of charging condenser 7 through device 3 and discharging condenser 7 by rendering pentode 1 conductive is accomplished at a repetitive rate dictated by the circuit parameters and the repetitive rate of the output of gate source 8.

The following components were employed in an exemplary circuit of this invention to demonstrate the successful production of linear sweep voltages. It is to be understood that these values are only exemplary and that numerous variations thereof will be within the skill of one familiar in the art to meet the requirements of a particular application.

| | |
|---|---|
| B+ | 300 volts. |
| Triode 3 | ½ of 6BQ7. |
| Resistance 2 | 2200 ohms. |
| Pentode 1 | 6AC7. |
| $E_{c2}$ | 150 volts. |
| Resistance 11 | 47,000 ohms. |
| $E_L$ | 280 volts. |
| Condenser 7 | 0.003 mf. |

Without a load the theoretical change in the slope of the output sweep voltage is $$\frac{\Delta E_p}{\mu E_L}$$

where $\mu$ is the amplification factor of the pentode, $\Delta E_p$ is the amplitude of the sweep, and $E_L$ is the voltage, sometimes referred to as a reference voltage, supplied by source 12. When the above exemplary circuit was operated into a 220,000 ohm load, the change in the voltage at grid 6 was observed to be approximately 0.15 volt. This is a change of slope of 0.15/280, or approximately 0.05 percent. This represents a departure from linearity of approximately $$\pm\frac{1}{16}\times 0.05$$

or 0.003 percent.

While we have described above the principles of our invention in connection with specific apparatus, it is to be clearly understood that this description is made only by way of example and not as a limitation to the scope of our invention as set forth in the objects thereof and in the accompanying claims.

We claim:

1. A sweep voltage generator comprising a reference potential, a voltage source having its negative terminal connected to said reference potential, a first conduction controlled device normally maintained non-conductive, a second conduction controlled device normally maintained conductive coupled in series relation with said first device between the positive terminal of said voltage source and said reference potential, a source of repetitive signals, means coupling the signals of said source of repetitive signals to said first device to periodically render said first device conductive, means coupling said second device to said first device to render said second device non-conductive upon conduction of said first device, and a resistance-capacitance time constant network coupled in shunt relation to said first device and in series relation to said second device between said second device and said reference potential, the capacitance of said network being charged by said second device when the latter is in the normal conduction condition and discharged by said first device when said first device is rendered conductive to produce a linear sweep voltage, the conduction current of said first device being limited to a constant current by said network.

2. A sweep voltage generator comprising a reference potential, a voltage source having its negative terminal connected to said reference potential, a first conduction controlled device normally maintained non-conductive, a second conduction controlled device normally maintained conductive coupled in series relation with said first device between the positive terminal of said voltage source and said reference potential, a source of repetitive signals, means coupling the signals of said source of repetitive signals to said first device to periodically render said first device conductive, means coupling said second device to said first device to render said second device non-conductive upon conduction of said first device, a source of predetermined voltage, a resistance-capacitance time constant network coupled in series relation with said source of predetermined voltage, and means coupling said source of predetermined voltage and said time constant network in shunting relation to said first device and in series relation to said second device between said second device and said reference potential, the capacitance of said network being charged by said second device when said second device is in the normal conduction condition and discharged by said first device when said first device is rendered conductive to produce a linear sweep voltage, the conduction current of said first device being limited to a constant current by said network.

3. A sweep voltage generator comprising a normally non-conductive constant current type electron discharge device having an anode, a cathode and at least two control electrodes, an anode circuit for said constant current device including a normally conductive electron discharge device, a source of predetermined voltage, a capacitor coupled between said anode circuit and one of said control electrodes, a resistor coupled between said source of predetermined voltage and the junction of said capacitor and said one of said control electrodes, said capacitor being charged through a first path including said one of said control electrodes, said cathode and said normally conductive device and a second path including said resistor and said source of predetermined voltage when said normally conductive device is conductive, a source of repetitive signals, means coupling the signals of said source of repetitive signals to the other of said control electrodes to periodically render said constant current device conductive, and means coupling said normally conductive electron discharge device to said constant current device to render said normally conductive electron discharge device non-conductive upon conduction of said constant current device thereby discharging said capacitor through said resistor, said source of predetermined voltage and said constant current device to produce a linear sweep voltage in said anode circuit, said resistor and said capacitor limiting the anode current of said constant current device to the constant current flowing through said resistor and said capacitor.

4. A sweep voltage generator comprising a normally non-conductive constant current type electron discharge device having an anode, a cathode and at least two control electrodes, an anode circuit for said constant current device including a normally conductive electron discharge device, a source of predetermined voltage, a resistance-capacitance time constant network coupled between said anode circuit and said predetermined voltage source, means coupling one of said control electrodes to the junction of the components of said time constant network, the capacitance of said time constant network being charged through said normally conductive device when conductive, a source of repetitive signals, means coupling the signals of said source of repetitive signals to the other of said control electrodes to periodically render said constant current device conductive, and means coupling said normally conductive electron discharge device to said constant current device to render said normally conductive electron discharge device non-conductive upon conduction of said constant current device thereby discharging said capacitance through said constant current device to produce a linear sweep voltage in said anode circuit, said time constant network limiting the anode current of said constant current device to the constant current flowing through said time constant network.

5. A sweep voltage generator comprising a normally non-conductive pentode, an anode circuit coupled to the anode of said pentode including a normally conductive electron discharge device, means coupling the cathode of said pentode to a reference potential, a source of predetermined voltage having one terminal thereof coupled to said reference potential, a resistance-capacitance time constant network coupled between said anode circuit and the other terminal of said predetermined voltage source, means coupling the control grid of said pentode to the junction of the components of said time constant network, the capacitance of said time constant network being charged through said normally conductive device when conductive, a source of repetitive signals, means coupling the signals of said source of repetitive signals to the suppressor grid of said pentode to periodically render said pentode conductive, and means coupling said normally conductive electron discharge device to said pentode to render said normally conductive device non-conductive upon conduction of said pentode thereby discharging said capacitance through said pentode to produce a linear sweep voltage in said anode circuit, said time constant network limiting the anode current of said pentode to the constant current flowing through said time constant network.

6. A sweep voltage generator comprising a normally non-conductive pentode, a normally conductive triode, an anode voltage source having a given value, means coupling the anode of said triode to said anode voltage source, a first resistor coupling the cathode of said triode to the anode of said pentode, means coupling the cathode of said pentode to ground, a capacitor coupled between the cathode of said triode and the control grid of said pentode, a source of predetermined voltage having a value less than said given value, means coupling the negative terminal of said source of predetermined voltage to ground, a second resistor coupling the positive terminal of said source of predetermined voltage to the junction of said capacitor and the control grid of said pentode, said capacitor being charged through a first path including said triode and the internal path between the control grid and cathode of said pentode and a second path including said second resistor and said source of predetermined voltage, a source of repetitive gate pulses, means coupling said source of gate pulse to the suppressor grid of said pentode to gate said pentode into conduction, means coupling the control grid of said triode to the anode of said pentode to render said triode non-conductive upon conduction of said pentode, the conduction of said pentode discharging said capacitor through the path including said first resistor, said second resistor, said pentode, and said source of predetermined voltage to produce a linear sweep voltage at the cathode of said triode, said capacitor and said second resistor limiting the anode current of said pentode to the constant current flow through said capacitor and said second resistor.

7. A sweep voltage generator comprising a normally non-conductive pentode, a normally conductive triode, an anode voltage source having a given value, means coupling the anode of said triode to said anode voltage source, a first resistor coupling the cathode of said triode to the anode of said pentode, means coupling the cathode of said pentode to ground, a capacitor coupled between the cathode of said triode and the control grid of said pentode, a source of predetermined voltage having a value less than said given value, means coupling the negative terminal of said source of predetermined voltage to ground, a second resistor coupling the positive terminal of said source of predetermined voltage to the junction of said capacitor and the control grid of said pentode, a source of given voltage having a value less than the value of the voltage of said source of predetermined voltage, means coupling the negative terminal of said source of given voltage to ground, means coupling the positive terminal of said source of given voltage to the screen grid of said pentode, said capacitor being charged through a first path including said triode and the internal path between the control grid and cathode of said pentode and a second path including said second resistor and said source of predetermined voltage, a source of repetitive gate pulses, means coupling said source of gate pulse to the suppressor grid of said pentode to gate said pentode into conduction, means coupling the control grid of said triode to the anode of said pentode to render said triode non-conductive upon conduction of said pentode, the conduction of said pentode discharging said capacitor through the path including said first resistor, said second resistor, said pentode, and said source of predetermined voltage to produce a linear sweep voltage at the cathode of said triode, said capacitor and said second resistor limiting the anode current of said pentode to the constant current flow through said capacitor and said second resistor.

References Cited in the file of this patent

UNITED STATES PATENTS

| | | |
|---|---|---|
| 2,221,665 | Wilson | Nov. 12, 1940 |
| 2,602,890 | Gaines | July 8, 1952 |

FOREIGN PATENTS

| | | |
|---|---|---|
| 632,159 | Great Britain | Nov. 17, 1949 |
| 714,521 | Great Britain | Sept. 1, 1954 |